United States Patent
Rusich

(10) Patent No.: US 12,466,234 B2
(45) Date of Patent: Nov. 11, 2025

(54) HYPERLOOP ENVIRONMENTAL CONTROL SYSTEM

(71) Applicant: Hamilton Sundstrand Corporation, Charlotte, NC (US)

(72) Inventor: Richard Rusich, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 231 days.

(21) Appl. No.: 18/312,874

(22) Filed: May 5, 2023

(65) Prior Publication Data

US 2024/0367481 A1    Nov. 7, 2024

(51) Int. Cl.
*B60H 1/00* (2006.01)

(52) U.S. Cl.
CPC ..... *B60H 1/00564* (2013.01); *B60H 1/00328* (2013.01)

(58) Field of Classification Search
CPC ............ B60H 1/00371; B60H 1/32284; B60H 1/00564; B60H 1/3233; B60H 1/00328; B61B 13/08; B61B 13/10; B61D 27/0018
See application file for complete search history.

(56) References Cited

U.S. PATENT DOCUMENTS

| | | | | |
|---|---|---|---|---|
| 4,261,178 A | * | 4/1981 | Cain | B09B 3/00 62/149 |
| 5,950,543 A | | 9/1999 | Oster | |
| 2011/0005244 A1 | * | 1/2011 | Finney | F25B 9/06 62/87 |
| 2019/0291575 A1 | * | 9/2019 | Rotenberg | B60K 7/0007 |
| 2019/0291875 A1 | * | 9/2019 | Behrens | B64D 13/06 |
| 2021/0197974 A1 | * | 7/2021 | Zhu | B01D 53/04 |

FOREIGN PATENT DOCUMENTS

| | | | | |
|---|---|---|---|---|
| CN | 107415971 A | | 12/2017 | |
| CN | 107472274 A | | 12/2017 | |
| CN | 111231670 A | * | 6/2020 | |
| CN | 112960006 A | | 6/2021 | |
| EP | 4382388 A1 | | 6/2024 | |
| JP | 2001010596 A | * | 1/2001 | B64D 13/06 |

OTHER PUBLICATIONS

European Search Report for Application No. 24174199.0, mailed Sep. 20, 2024, 9 pages.

* cited by examiner

*Primary Examiner* — Frantz F Jules
*Assistant Examiner* — Martha Tadesse
(74) *Attorney, Agent, or Firm* — CANTOR COLBURN LLP

(57) ABSTRACT

An environmental control system for conditioning a cabin of a vehicle positioned in an enclosed air-evacuated environment includes a first inlet for receiving a first medium and a second inlet for receiving a second medium. The first medium and the second medium are mixed at a mixing point located upstream from the cabin to form a mixed medium. The environmental control system additionally includes a coolant loop having a coolant circulating therein and at least one heat exchanger. The coolant loop includes a pump for circulating the coolant. The coolant is thermally coupled to the mixed medium at the at least one heat exchanger.

19 Claims, 1 Drawing Sheet

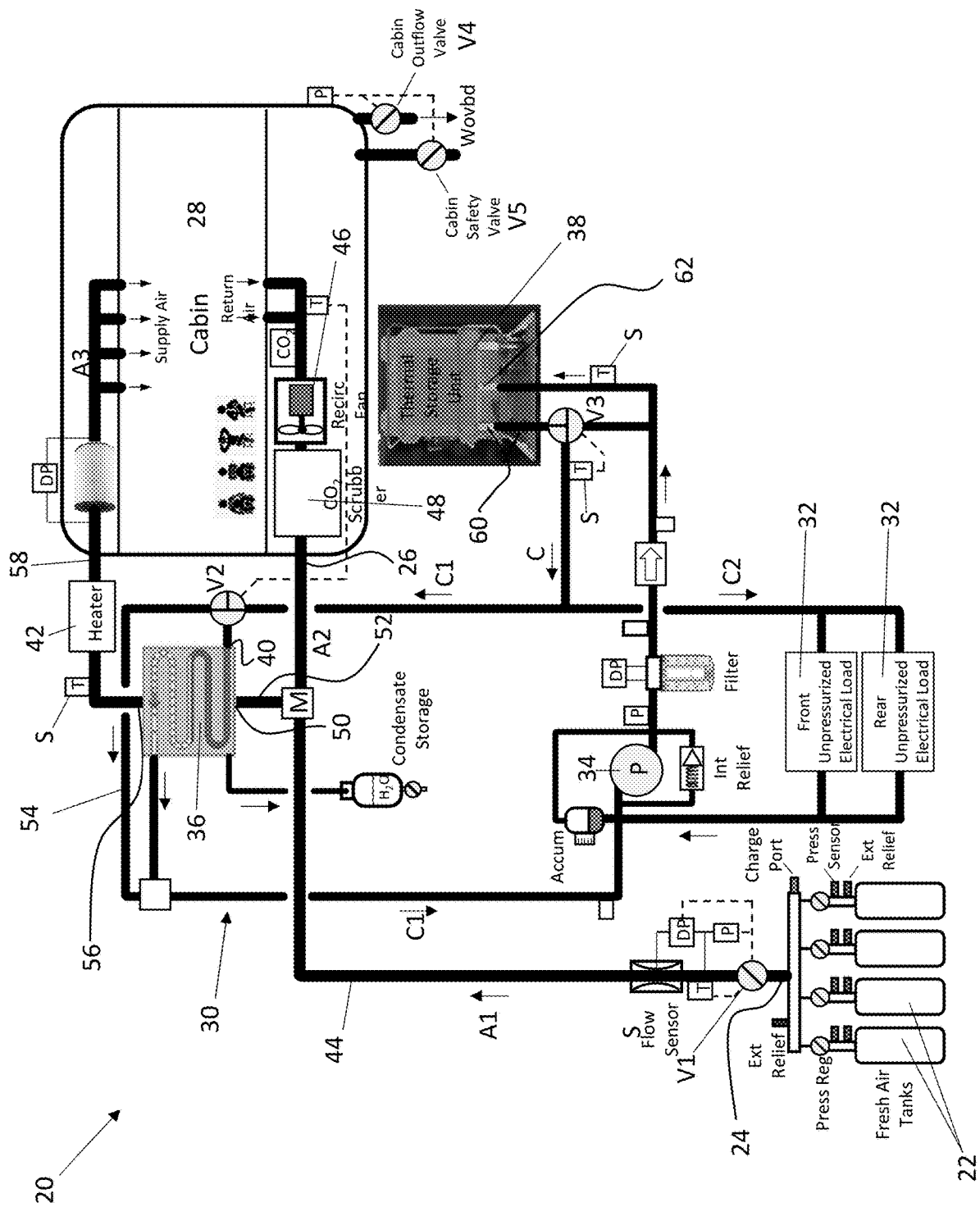

HYPERLOOP ENVIRONMENTAL CONTROL SYSTEM

BACKGROUND

The present disclosure relates to an environmental control system of a vehicle, and more particularly, to an environmental control system (ECS) for a vehicle travelling in a low pressure or zero pressure environment.

In general, a high-speed public transportation concept called the hyperloop has been proposed that can include a vehicle similar to a train car that travels inside of a tube. The air in the tube can be evacuated to a very deep vacuum, allowing the train to reach very high speeds without incurring the high-power demand that would otherwise be needed to overcome the high aerodynamic drag at normal atmospheric pressure. An air lock can permit passenger boarding and disembarking from the train station to the train without discharging the atmospheric air in the station into the vacuum in the tube.

As with similar transportation vehicles, environmental control of the occupied cabin is generally required to maintain adequate comfort and to provide heating, cooling and/or a continual supply of fresh air. Some typical methods used to provide air conditioning may not be conducive to this application. For example, many air conditioning systems exist which provide cool air to the cabin and on-board electronics may draw air from or ultimately exhaust the heat to the ambient atmosphere via convection heat transfer. When the ambient atmosphere is non-existent, as in space applications, heat can be rejected to deep space via radiation heat transfer. In the case of the hyperloop, there is little to no atmosphere in the tube, so rejecting heat into the tube via convection may not be practical while maintaining a reasonably sized heat exchanger to reject the heat. Moreover, heat rejection via radiation may also not be practical, since unlike radiating to space, which is near absolute zero degrees in temperature, the walls of the tube can be warmer than inside the cabin when the outside ambient temperature is warm. Moreover, while the train is moving at high speed, the amount of available electrical power consumption is limited since power is generally supplied solely by on-board batteries that have a limited quantity of electrical energy.

BRIEF DESCRIPTION

According to an embodiment, an environmental control system for conditioning a cabin of a vehicle positioned in an enclosed air-evacuated environment includes a first inlet for receiving a first medium and a second inlet for receiving a second medium. The first medium and the second medium are mixed at a mixing point located upstream from the cabin to form a mixed medium. The environmental control system additionally includes a coolant loop having a coolant circulating therein and at least one heat exchanger. The coolant loop includes a pump for circulating the coolant. The coolant is thermally coupled to the mixed medium at the at least one heat exchanger.

In addition to one or more of the features described above, or as an alternative, in further embodiments the at least one heat exchanger further comprises a first heat exchanger and a second heat exchanger.

In addition to one or more of the features described above, or as an alternative, in further embodiments the second heat exchanger is a heat sink for the coolant within the coolant loop.

In addition to one or more of the features described above, or as an alternative, in further embodiments the second heat exchanger is a thermal storage unit containing a phase change material.

In addition to one or more of the features described above, or as an alternative, in further embodiments a configuration of the thermal storage unit is selected to cool the coolant to meet a temperature demand of the cabin for a duration of travel of the vehicle between stations.

In addition to one or more of the features described above, or as an alternative, in further embodiments the coolant loop includes a bypass conduit arranged in parallel with the first heat exchanger relative to a flow of the coolant.

In addition to one or more of the features described above, or as an alternative, in further embodiments including a valve operable to control a flow of coolant provided to the first heat exchanger and to the bypass conduit. The position of the valve is selected in response to a temperature demand of the cabin.

In addition to one or more of the features described above, or as an alternative, in further embodiments the second medium is cabin recirculation air.

In addition to one or more of the features described above, or as an alternative, in further embodiments including a recirculation fan fluidly coupled to the cabin. The recirculation fan is operable to provide the second medium to the second inlet.

In addition to one or more of the features described above, or as an alternative, in further embodiments including at least one cleaning device. The at least one cleaning device is fluidly connected to the second inlet and arranged upstream from the second inlet relative to a flow of the second medium.

In addition to one or more of the features described above, or as an alternative, in further embodiments the coolant loop further comprises at least one electrical load.

In addition to one or more of the features described above, or as an alternative, in further embodiments the at least one electrical load and the at least one heat exchanger are arranged in parallel relative to a flow of the coolant.

In addition to one or more of the features described above, or as an alternative, in further embodiments including at least one vessel of a pressurized first medium located on board the vehicle.

In addition to one or more of the features described above, or as an alternative, in further embodiments the vehicle is a train.

According to an embodiment, a method of operating an environmental control system to condition a cabin of a vehicle positioned in an enclosed, air-evacuated tube includes mixing a first medium with a second medium to form a mixed medium, conditioning the mixed medium at a first heat exchanger to form a conditioned mixed medium and releasing heat from the coolant at a second heat exchanger of the coolant loop. The mixed medium is conditioned by coolant from a coolant loop at the first heat exchanger and the second heat exchanger is fluidly coupled to the first heat exchanger.

In addition to one or more of the features described above, or as an alternative, in further embodiments mixing the first medium with the second medium to form the mixed medium includes mixing fresh air with cabin recirculation air.

In addition to one or more of the features described above, or as an alternative, in further embodiments the second heat exchanger is a thermal storage unit containing a phase change material.

In addition to one or more of the features described above, or as an alternative, in further embodiments including recharging the thermal storage unit when the vehicle is parked at a station.

In addition to one or more of the features described above, or as an alternative, in further embodiments including conditioning at least one electrical load using the coolant.

In addition to one or more of the features described above, or as an alternative, in further embodiments including dividing the coolant at an outlet of the second heat exchanger into a first coolant flow and a second coolant flow. The first coolant flow being provided to the first heat exchanger and the second coolant flow being provided to the at least one electrical load in parallel.

BRIEF DESCRIPTION OF THE DRAWINGS

The following descriptions should not be considered limiting in any way. With reference to the accompanying drawings, like elements are numbered alike:

The FIGURE is a schematic diagram of an example environmental control system (ECS) for a vehicle travelling within a hyperloop tube according to an embodiment.

DETAILED DESCRIPTION

A detailed description of one or more embodiments of the disclosed apparatus and method are presented herein by way of exemplification and not limitation with reference to the FIGURES.

The example embodiments disclosed herein are illustrative of a hyperloop environmental control system, and assemblies of the present disclosure and methods/techniques thereof. It should be understood, however, that the disclosed embodiments are merely examples of the present disclosure, which may be embodied in various forms. Therefore, details disclosed herein with reference to example hyperloop environmental control systems and associated processes/techniques of fabrication/assembly and use are not to be interpreted as limiting, but merely as the basis for teaching one skilled in the art how to make and use the systems/assemblies and/or alternative systems/assemblies of the present disclosure.

With reference now to the FIGURE, an example of an environmental control system 20 suitable for use with a vehicle movable within an enclosed air-evacuated environment is illustrated. The air-evacuated environment has a substantially zero-pressure or is a vacuum. In an embodiment, the vehicle is a car or train movable through a tube of a hyperloop system. As shown, the environmental control system 20 includes one or more vessels 22 located on-board the vehicle and configured to store a pressurized medium therein, such as high-pressure air for example. In an embodiment, the pressure of the medium within the at least one vessel 22 is between about 2000 psi about 3000 psi. The one or more vessels 22 may be considered a first fluid source and are fluidly coupled to a first inlet 24 of the environmental control system 20 to deliver a controlled flow of a first medium A1 to the environmental control system 20. It should be appreciated that the first medium A1 may be considered "fresh air" in that the air has not previously been circulated within the environmental control system 20. The one or more vessels 22 may be filled, refilled, or replaced when the vehicle is stopped at a station or other facility.

The environmental control system 20 may additionally receive a second medium A2 at a second inlet 26. In one embodiment, the second inlet 26 is operably coupled to a volume 28, such as the cabin or chamber of the vehicle in which the people are typically located. In an embodiment, the second medium A2 is cabin recirculation air drawn. The environmental control system 20 is operable to provide a conditioned flow of one or both of the first medium A1 and the second medium A2 to the cabin 28 at a standard atmospheric pressure of about 14.7 psi.

In addition to providing a conditioned medium to the chamber 28, the environmental control system 20 may be used to transfer or redistribute heat between various systems onboard the vehicle. For example, a coolant loop 30 of the environmental control system 20 may be used not only to condition the medium provided to the cabin 28 but also to cool one or more electrical loads 32 located onboard the vehicle. As shown, a coolant C, such as propylene glycol or ethylene glycol for example, is configured to circulate through at least one heat exchanger, and in some embodiments, at least one electrical load 32 via a coolant pump 34.

In the illustrated, non-limiting embodiment, the at least one heat exchanger includes a first heat exchanger 36 and a second heat exchanger 38 arranged in series relative to a flow of the coolant C. In the illustrated, non-limiting embodiment, a flow of medium to be provided to the cabin 28 is thermally coupled to the coolant loop 30 at the first heat exchanger 36. The skilled artisan will realize that the first heat exchanger 36 can be any type of heat exchanger that achieves the desired result of conditioning or controlling a temperature of the medium to be provided to the cabin 28. It should be appreciated that either the medium, the coolant C, or both, may make multiple passes through the first heat exchanger 36. Further, the medium and/or the coolant C may be arranged in any suitable flow configuration at the first heat exchanger 36, such as a crossflow, a parallel flow, a counter-flow, or any combination thereof. Examples of the type of heat exchangers that may be used, include, but are not limited to, double pipe, shell and tube, plate, plate and shell, adiabatic shell, plate fin, pillow plate, and fluid heat exchangers.

As will be described in more detail below, during operation of the environmental control system 20 in a "cooling mode" where the medium provided to the cabin 28 is intended to reduce the temperature therein, heat is transferred from the medium to the relatively cool coolant C at the first heat exchanger 36. Heat may also be transferred from the medium to the relatively cool coolant C at the first heat exchanger 36 during operation in a "heating mode" where the air provided to the cabin 28 is intended to increase the temperature therein.

The second heat exchanger 38 may be configured as a heat sink operable to remove heat from the coolant C circulating within the coolant loop 30. In the illustrated, non-limiting embodiment, the second heat exchanger 38 is a thermal storage unit. The thermal storage unit 38 may be filled with a phase change material, such as a wax or ice for example. As heated coolant C flows across or around the thermal storage unit 38, heat from the coolant C transfers to the phase change material within the thermal storage unit 38. This heat transfer not only cools the coolant C, but also may cause at least a portion of the phase change material to transform from a first state, such as a solid for example, to a second state, such as a liquid for example. However, embodiments where the first state is a liquid and the second state is a gas are also contemplated herein.

The size of the thermal storage unit 38, and in some embodiments the phase change material stored therein, may be selected to sufficiently cool the coolant C circulating through the coolant loop 30 for the duration of travel of the vehicle between stations. Once the vehicle has reached a station, the thermal storage unit 38 can be "recharged" by removing the heat therefrom. In embodiments where the thermal storage unit 38 is filled with a phase change material, recharging the thermal storage unit 38 causes the phase change material to transform from the second phase back to the first phase.

The outlet of the second heat exchanger 38 is fluidly connected to an inlet 40 of the first heat exchanger 36, and in some embodiments is also fluidly connected to one or more electrical loads 32. Further, the coolant pump 34 is operably coupled to the coolant loop 30 to facilitate movement of the coolant C between the plurality of components of the coolant loop 30.

The elements of the environmental control system 20 are connected via valves, tubes, pipes, conduits, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the environmental control system 20 can be regulated to a desired value. For instance, a first valve V1, such as an airflow regulator for example, is configured to control the flow of the first medium A1 provided to the environmental control system 20 via the first inlet 24. A second valve V2 may be operable to control a flow of coolant provided to the first heat exchanger and/or to conduit that bypasses the first heat exchanger. A third valve V3 may be operable to control a flow of coolant at the outlet of the second heat exchanger 38 and a fourth valve V4 may be used to exhaust air from the cabin 28 into the ambient atmosphere.

One or more of the valves V1-V5 may be configured to receive commands from an ECS controller (not shown), such as in response to feedback provided from one or more sensors S located in specific/desired locations in the system 20. Although various pressure and temperature sensors are illustrated, it should be appreciated that other sensors operable to monitor any suitable parameter of the environmental control system 20 and/or the coolant loop 30 are within the scope of the disclosure.

Furthermore, a heater 42, such as an electrical heater for example, may also be provided for instances where the medium to be delivered to the cabin 28 needs to be heated. In such embodiments, the heater 42 may be arranged directly upstream from the cabin 28 relative to a flow of the conditioned medium.

In operation, a flow of the first medium A1 at the first inlet 24, controlled by valve V1, is provided to the environmental control system 20. The first medium A1 flows through at least one conduit 44 to a mixing point, identified as M. At the same time, the second medium A2 is drawn from within the cabin 28 through one or more return ducts via a recirculation fan 46. The second medium A2 is cleaned or scrubbed, such as for carbon dioxide, pollutants, or other particles using one or more filters or other cleaning devices 48 and is then output via inlet 26. The first medium A1 is mixed with the second medium A2 output from the cabin 28 at the mixing point M. The resulting mixed medium, identified as A3, is provided to an inlet 50 of the first heat exchanger 36 of the coolant loop 30, via a conduit 52.

Depending on the temperature demand of the cabin 28, the position of the second valve V2 is adjusted to control the flow of coolant C provided to the first heat exchanger 36. Accordingly, in some embodiments, the valve V2 may be positioned such that at least a portion of the coolant C bypasses the first heat exchanger 36 via a bypass conduit 54. Within the first heat exchanger, heat is configured to transfer between the mixed medium A3 and the coolant C so that the conditioned mixed medium A3 provided at the outlet 56 of the first heat exchanger 36 has a desired temperature. When the environmental control system 20 is in a cooling mode, the coolant C acts as a heat sink within the first heat exchanger 36 to cool the mixed medium A3. However, in a heating mode, the coolant C may be configured to transfer heat to the mixed medium A3.

From the outlet 56 of the first heat exchanger 36, the mixed medium A3 is provided to the cabin 28 via at least one conduit 58. In embodiments where the temperature of the mixed medium A3 is insufficient to meet to temperature demand of the cabin 28, the heater 42 is operated to further heat the mixed medium A3 before it reaches the cabin 28. One or more valves V4, V5 associated with the cabin 28 are operable to exhaust a minimal amount of air from the cabin 28. In an embodiment, the amount of first air provided at the inlet 24 is generally equal to the amount of air exhausted from the cabin 28 into the ambient atmosphere surrounding the vehicle.

In the illustrated, non-limiting embodiment, at the outlet 60 of the second heat exchanger 38, the coolant C is separated into a first coolant flow C1 and a second coolant flow C2. The first coolant flow C1 is provided to the first heat exchanger 36 to condition the mixed medium A3 therein or is configured to bypass the first heat exchanger 36 via the bypass conduit 54. The second coolant flow C2 may act as a heat sink configured to remove heat from one or more electrical loads 32 arranged along the coolant flow path. Both the first coolant flow C1 and the second coolant flow C2 are circulated through the coolant loop 30 by the coolant pump 34. Further, the first and second coolant flows C1, C2 may be rejoined at, upstream from, or even downstream from the coolant pump 34. However, in an embodiment, this rejoinder occurs upstream from an inlet 62 of the second heat exchanger 38. Once rejoined, the heated coolant C is provided to the second heat exchanger 38 where the coolant C is cooled.

An environmental control system 20 as illustrated and described here provides an efficient system for conditioning a cabin 28 of a vehicle travelling within a vacuum.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system for conditioning a cabin of a vehicle positioned in an enclosed air-evacuated environment, the environmental control system comprising:
   a first source of medium, the first source of medium including a vessel located on-board the vehicle;
   a first inlet for receiving aa first flow of medium from the first source of medium;
   a second inlet for receiving a second flow of medium from a second source of medium, wherein the first flow of medium and the second flow of medium are mixed at a mixing point located upstream from the cabin to form a flow of mixed medium; and
   a coolant loop having a coolant circulating therein, the coolant loop including a pump for circulating the coolant and at least one heat exchanger, wherein the mixing point of the first flow of medium and the second flow of medium is arranged upstream from the at least one heat exchanger, the coolant being thermally coupled to the flow of mixed medium at the at least one heat exchanger.

2. The environmental control system of claim 1, wherein the at least one heat exchanger further comprises a first heat exchanger and a second heat exchanger.

3. The environmental control system of claim 2, wherein the second heat exchanger is a heat sink for the coolant within the coolant loop.

4. The environmental control system of claim 2, wherein the second heat exchanger is a thermal storage unit containing a phase change material.

5. The environmental control system of claim 4, wherein a configuration of the thermal storage unit is selected to cool the coolant to meet a temperature demand of the cabin for a duration of travel of the vehicle between stations.

6. The environmental control system of claim 2, wherein the coolant loop further comprises a bypass conduit arranged in parallel with the first heat exchanger relative to a flow of the coolant.

7. The environmental control system of claim 6, further comprising a valve operable to control a flow of coolant provided to the first heat exchanger and to the bypass conduit, a position of the valve being selected in response to a temperature demand of the cabin.

8. The environmental control system of claim 1, wherein the second flow of medium is cabin recirculation air.

9. The environmental control system of claim 8, further comprising a recirculation fan fluidly coupled to the cabin, the recirculation fan being operable to provide the second flow of medium to the second inlet.

10. The environmental control system of claim 8, further comprising at least one cleaning device, the at least one cleaning device being fluidly connected to the second inlet and arranged upstream from the second inlet relative to the second flow of the medium.

11. The environmental control system of claim 1, wherein the coolant loop further comprises at least one electrical load.

12. The environmental control system of claim 11, wherein the at least one electrical load and the at least one heat exchanger are arranged in parallel relative to a flow of the coolant.

13. The environmental control system of claim 1, wherein the vehicle is a train.

14. A method of operating an environmental control system to condition a cabin of a vehicle positioned in an enclosed, air-evacuated tube, the method comprising:
   mixing a first flow of medium with a second flow of medium at a mixing point to form a flow of mixed medium, the first flow of medium being provided from a vessel located on-board the vehicle and the second flow of medium being provided from the cabin of the vehicle;
   conditioning the flow of mixed medium at a first heat exchanger to form a conditioned flow of mixed medium, the flow of mixed medium being conditioned by coolant from a coolant loop at the first heat exchanger, the first heat exchanger being arranged downstream from the mixing point; and
   releasing heat from the coolant at a second heat exchanger of the coolant loop, the second heat exchanger being fluidly coupled to the first heat exchanger.

15. The method of claim 14, wherein mixing the first flow of medium with the second flow of medium to form the flow of mixed medium further comprises mixing fresh air with the cabin recirculation air.

16. The method of claim 14, wherein the second heat exchanger is a thermal storage unit containing a phase change material.

17. The method of claim 16, further comprising recharging the thermal storage unit when the vehicle is parked at a station.

18. The method of claim 14, further comprising conditioning at least one electrical load using the coolant.

19. The method of claim 18, further comprising dividing the coolant at an outlet of the second heat exchanger into a first coolant flow and a second coolant flow, the first coolant flow being provided to the first heat exchanger and the second coolant flow being provided to the at least one electrical load in parallel.

* * * * *